United States Patent
Gapper

(10) Patent No.: US 11,165,799 B2
(45) Date of Patent: Nov. 2, 2021

(54) ANOMALY DETECTION AND PROCESSING FOR SEASONAL DATA

(71) Applicant: Microsoft Technology Licensing, LLC, Redmond, WA (US)

(72) Inventor: Justin Gapper, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 854 days.

(21) Appl. No.: 15/946,054

(22) Filed: Apr. 5, 2018

(65) Prior Publication Data

US 2019/0311297 A1 Oct. 10, 2019

(51) Int. Cl.
| | | |
|---|---|---|
| *G06F 15/173* | (2006.01) | |
| *H04L 29/06* | (2006.01) | |
| *G06N 7/00* | (2006.01) | |
| *G06N 20/00* | (2019.01) | |
| *G06K 9/62* | (2006.01) | |
| *G06F 17/18* | (2006.01) | |
| *G06K 9/00* | (2006.01) | |

(52) U.S. Cl.
CPC ......... *H04L 63/1425* (2013.01); *G06F 17/18* (2013.01); *G06K 9/00523* (2013.01); *G06K 9/6284* (2013.01); *G06N 7/005* (2013.01); *G06N 20/00* (2019.01)

(58) Field of Classification Search
CPC .... G06N 20/00; G06N 7/005; H04L 63/1425; G06K 9/6284; G06K 9/00523; G06F 17/18
See application file for complete search history.

(56) References Cited

U.S. PATENT DOCUMENTS

| | | |
|---|---|---|
| 7,346,471 B2 | 3/2008 | Chickering et al. |
| 7,610,214 B1 | 10/2009 | Dwarakanath et al. |
| 7,783,510 B1 | 8/2010 | Gilgur et al. |
| 8,914,317 B2 | 12/2014 | Biem |

(Continued)

OTHER PUBLICATIONS

"International Search Report and Written Opinion Issued in PCT Application No. PCT/US19/024170", dated Jun. 4, 2019, 14 Pages.

(Continued)

*Primary Examiner* — Anh Nguyen
(74) *Attorney, Agent, or Firm* — Schwegman Lundberg & Woessner, P.A.

(57) ABSTRACT

Systems and devices for the evaluation and analysis of computing system data for anomaly detection and processing are disclosed. In an example, operations to detect anomalies include: obtaining a source event stream of data produced from operation of a computing system; converting the source event stream into a frequency signal; identifying an estimated seasonality from the frequency signal; scaling the estimated seasonality to a target event stream produced from operation of the computing system; identifying anomalies of a principal vector of the target event stream, based on deviation from the estimated seasonality; and causing the computing system to perform an action based on the identified anomalies. In a further example, the operations include scaling the estimated seasonality to a subset of the target event stream indicating minor vectors; and identifying anomalies of the minor vectors, based on deviation of the subset of data from the estimated seasonality.

16 Claims, 9 Drawing Sheets

(56) References Cited

U.S. PATENT DOCUMENTS

| | | | |
|---|---|---|---|
| 9,392,463 B2 | 7/2016 | Anand | |
| 9,471,544 B1* | 10/2016 | Yu | G06F 17/18 |
| 2014/0111517 A1 | 4/2014 | Vela et al. | |
| 2017/0249648 A1 | 8/2017 | Garvey et al. | |
| 2017/0249763 A1* | 8/2017 | Garvey | G06Q 10/06 |
| 2017/0279698 A1 | 9/2017 | Sartran et al. | |
| 2018/0039898 A1* | 2/2018 | Saini | G06F 21/554 |

OTHER PUBLICATIONS

Gill, Jagreet Kaur, "Anomaly Detection of Time Series Data Using Machine Learning & Deep Learning", Retrieved from: <<https://www.xenonstack.com/blog/data-science/anomaly-detection-of-time-series-data-using-machine-learning-deep-learning>>, Jun. 23, 2017, 33 Pages.

Kaiser, et al., "Seasonal outliers in Time Series", In Working Paper 99-49 of University Carlos III of Madrid, Jun. 1999, pp. 1-27.

Zhou, et al., "Detecting Anomaly Regions in Satellite Image Time Series Based on Sesaonal Autocorrelation Analysis", In Proceedings of ISPRS Annals of the Photogrammetry, Remote Sensing and Spatial Information Sciences, vol. 3, Jul. 12, 2016, pp. 303-310.

* cited by examiner

ANOMALY DETECTION AND PROCESSING FOR SEASONAL DATA

BACKGROUND

Data analysis has been performed in a variety of computer operational settings to identify anomalies or outliers that deviate from an expected pattern or result. Conventional approaches for analyzing anomalies in data sets are often limited to the comparison of data obtained from similar time periods (e.g., data produced on a Monday with data produced on previous Mondays). This type of comparison will often require many data observations and the specification of manually tuned parameters and rules to identify the expected pattern and whether deviation has occurred. As a result, conventional approaches often are unable to detect anomalies in short time intervals, or when there are only small amounts of data available.

The use of conventional statistical methods to analyze anomalies has encountered similar limitations, while also introducing the potential of higher false positive rates if the wrong pattern is observed. Although some advanced machine learning techniques have been suggested and researched to perform anomaly analysis from data sets, the effective use of machine learning techniques require an extensive amount of labeled training data and human involvement in training machine learning models to generate useful results.

SUMMARY

Various details for the embodiments of the inventive subject matter are provided in the accompanying drawings and in the detailed description text below. It will be understood that the following section provides summarized examples of some of these embodiments.

Embodiments described herein generally relate to the detection of anomalies in data produced by and within computing system operations and in particular, to the processing and analysis of highly seasonal data to detect anomalies. In an example, embodiments may include performing electronic operations to detect anomalies from computing system events, with the operations including: obtaining a source event stream of data, the source event stream of data produced from operation of a computing system; converting the source event stream of data into a frequency signal; identifying an estimated seasonality from the frequency signal; scaling the estimated seasonality to a target event stream of data, the target event stream of data produced from operation of the computing system; identifying one or more anomalies of a principal vector of the target event stream of data, based on deviation of the target event stream of data from the estimated seasonality; and causing the computing system to perform an action based on the one or more identified anomalies determined from the target event stream of data.

In a further example, the embodiments may perform operations including scaling the estimated seasonality to a subset of the target event stream of data, the subset of the target event stream of data indicating one or more minor vectors, and identifying one or more anomalies of the one or more minor vectors, based on deviation of the subset of the target event stream of data from the estimated seasonality, such that the action performed in the computing system is further based upon the one or more identified anomalies of the one or more minor vectors. In still further examples, the embodiments may provide operations including generating residual data by removing data values exceeding the estimated seasonality from the subset of the target event stream of data, and applying a statistical method to the residual data, to identify the one or more anomalies of the one or more minor vectors from the residual data. In an example, the principal vector is based on usage of the computing system, such that the one or more minor vectors are respectively based on usage of one or more software applications represented in the usage of the computing system.

In a further example, the operations of scaling the estimated seasonality to the target event stream of data include subtracting the estimated seasonality from the frequency signal to identify a set of residuals, such that the operations of identifying the one or more anomalies include applying a statistical analysis on the set of residuals. Also in an example, the source event stream indicates a count of events obtained from a computing system per time interval, such that the source event stream of data is converted to represent the count of events into the frequency signal. Also in an example, the frequency signal is representative of a combination of trend, seasonality, anomalies, and noise, such that the target event stream of data is selected based on identified vectors of observations that have similar seasonality patterns. Also in an example, the operations of converting the source event stream of data into the frequency signal include transforming the source event stream of data into component frequencies, and applying a low pass filter. Also in an example, the operations of converting the source event stream of data into the frequency signal further include applying a fast Fourier transform to the frequency signal, and applying the low pass filter to exclude data values exceeding a defined value.

An embodiment discussed herein includes a computing device including processing hardware (e.g., a processor) and memory hardware (e.g., a storage device or volatile memory) including instructions embodied thereon, such that the instructions, which when executed by the processing hardware, cause the computing device to implement, perform, or coordinate the electronic operations. Another embodiment discussed herein includes a computer program product, such as may be embodied by a machine-readable medium or other storage device, which provides the instructions to implement, perform, or coordinate the electronic operations. Another embodiment discussed herein includes a method operable on processing hardware of the computing device, to implement, perform, or coordinate the electronic operations.

As discussed herein, the logic, commands, or instructions that implement aspects of the electronic operations described above, may be performed at a client computing system, a server computing system, or a distributed or networked system (and systems), including any number of form factors for the system such as desktop or notebook personal computers, mobile devices such as tablets, netbooks, and smartphones, client terminals, virtualized and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described above, or other aspects depicted in the accompanying drawings and detailed description below.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
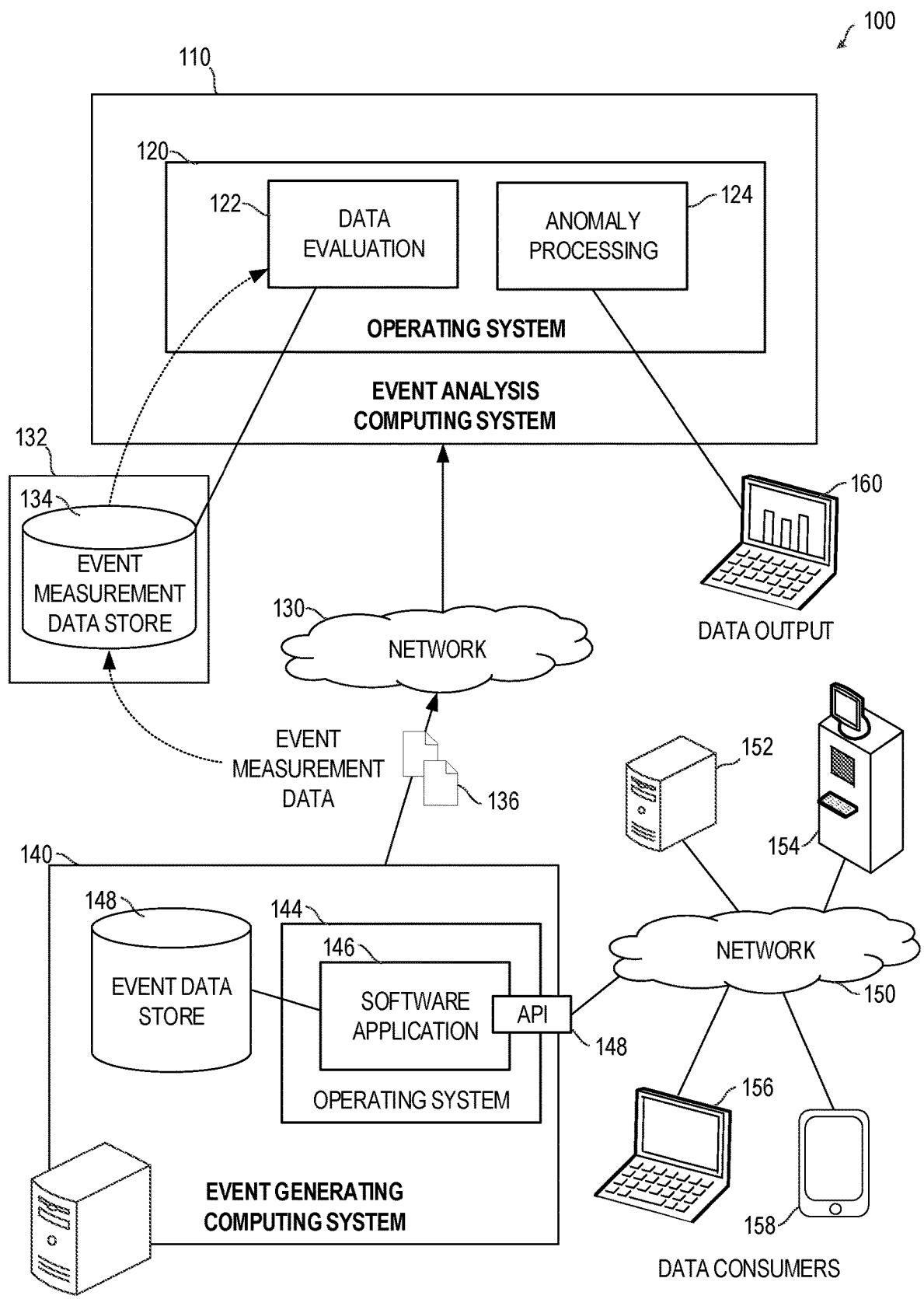
FIG. 1 illustrates a scenario for the collection and analysis of seasonal data produced from computing system operations, according to an example.

In the following description, methods, configurations, and related apparatuses are disclosed for analyzing data and performing various workflows for the detection, identification, and response to anomalies, outliers, and other variations in computing system data values. These techniques may be used perform analysis of data in warm and hot paths, with considerations of seasonality and other types of dynamic or adaptive changes. The result of this data analysis may be used to monitor or modify the source computing system or platform, another computing system or platform, or cause another effect within a data evaluation system or platform.

The techniques discussed herein technique may be applied to a variety of types of computing system data, with only minor variations in tuning. Thus, in contrast to existing approaches that require extensive setup or a large amount of data rules and constraints to be customized to the type and origin of data, the presently disclosed techniques provide useful anomaly monitoring and responses from the outset. The techniques discussed herein can also be contrasted with existing approaches that require significant time and human or computing resources to train and maintain parameters, and the collection of significant amounts of historical observation data for training and usage.

Seasonality represents a regular, repeated variation at specific intervals over a time series. Such change often makes it difficult to obtain useful measurements and information from time series data sets. For instance, seasonality can mask outlier data points (or data points that appear to be outliers) that could in fact simply be the result of periods of normal heightened activity. The following techniques include a process for identifying and removing seasonal values from a time series of data, so that remaining data can be objectively observed, analyzed, and responded to. Given the appropriate scenario, the following techniques can be used to diminish or remove much of the seasonality from the data, making it easier to detect anomalies in real-time, from both warm or hot path data, with limited training observations.

In an example, a process of anomaly detection includes variations involving: using a principal vector of a data set to isolate seasonality from the data set values; scaling data to the magnitude of minor (non-principal) vectors in the data set values; and detecting anomalies using the residual values that result from subtracting the seasonality from the minor vector(s). The process can be deployed to as many minor vectors as are related to the principal vector. This enables a large number of events or activities to be monitored, and therefore not only identify anomalies in the system but the precise source and location of the error. As a result, this process provides a significant and useful detection of anomalies and identification of root causes for failure.

The techniques discussed herein may perform an enhanced form of data analysis with an accompanying benefit in the technical processes performed in computer and information systems. These benefits may include: improved responsiveness and control of actions launched from computing operation data streams; improved accuracy and precision of the evaluation of data seasonality; increased speed for the analysis of data records; improved scale towards large data sets; and improved results and output, including a simplified identification of a source or root cause of an anomaly. Such benefits may be achieved with accompanying improvements in technical operations in the computer system itself (including improved usage of processor, memory, bandwidth, or other computing system resources). Further, such benefits may also be used to initiate or trigger other dynamic computer activities, leading to further technical benefits and improvements with electronic operational systems.

FIG. 1 provides an overview of an example scenario 100 for collection and analysis of seasonal data, for the evaluation of anomalies in data produced from respective computing devices. As illustrated in FIG. 1, data consumer computing devices 152, 154, 156, 158 access an event generating computing system 140, via a network 150, through the use of an application programming interface 148 or other interface. The event generating computing system 140 may operate a software application 146 and an operating system 144 to facilitate the operations of the API 148. As discussed in the following examples, the operations of the API 148 are measured, recorded, and analyzed in the scenario 100 for anomalies. The consumer computing devices may include systems in the form of a server 152, a commercial/industrial computing platform 154, a personal computer 156, a mobile computing device 158, among other form factors. It will be appreciated, however, that the particular type of data consumer and type of event generating process may vary significantly, as the present anomaly detection process may apply to a number of different environments and settings.

In an example, the event generating computing system 140 operates to produce and store event data from normal system operations. An "event" may accordingly comprise as a discrete system operation that occurs in an identifiable fashion. For instance, as part of the operation of the API 148, the software application 146, the operating system 144, and other aspects of the event generating computing system 148, various events and event actions are logged and persisted in an event data store 148. For instance, the event data store 148 may provide a location within the event generating computing system 140 for hosting individual data points, samples, or aggregates in a time-series set of data. In other examples, the event data may be communicated to or hosted by other remote data stores (e.g., in cloud-hosted storage). The event data also may be aggregated, refined, filtered, or otherwise processed by the event generating computing system 140, components of the network 150, the operating system, 144, the software application 146, or other entities. Likewise, in other examples, additional computing systems may provide or supplement the event data.

The event data hosted in or obtained from the event data store 148 (or elsewhere in the event generating computing system 140) may be communicated to an event analysis computing system 110 in the form of event measurement data 136. For instance, the event measurement data 136 may represent event data directly or indirectly (e.g., as abstraction or aggregation of event data) that is communicated via a network 130 in response to response-request exchanged between the event analysis computing system 110 and the event generating computing system 130. As shown, this event measurement data 136 may also be stored, persisted, or hosted in connection with an event measurement data system 132 that includes an event measurement data store 134.

In an example, the event analysis computing system 110 may include an operating system 120 that executes a series of processes, including a data evaluation process 122 and an anomaly processing process 124, used to request, filter, evaluate, and analyze the event measurement data 136, according to the anomaly detection processes discussed herein. For example, the data evaluation process 122 may retrieve stored or cached versions of the event measurement data 136 for the purposes of operating the anomaly detection process. Also for example, the anomaly processing process 124 may operate a series of algorithms or functions used to produce a data output 160 that identifies anomalies. This data output 160 may be provided in the form of summarized or detailed data values, graphical representations or mappings, or computer system commands, in connection with the anomaly detection process further discussed herein. Although a computing system with a graphical display is depicted in the data output 160, it will be understood that the scenario 100 is not limited to any particular form of output, and in some cases, direct computer processes or actions, data logging and storage, or commands may be performed or implemented as a result of the anomaly detection process. Other variations involving the use of networked, cloud-based, virtualized, or distributed computing system processes may also lead to changes within the scenario 100 and the accompanying inputs and outputs.

In the following examples, the process of anomaly detection may be used in connection with any group or collection of seasonal streams of data that produces anomalies. The process of anomaly detection also may be used to trigger or result in various numbers or types of useful data outputs in a computing system. In an example, a process for the detection of anomalies may include a sequential workflow used to process and analyze data from an event stream of raw, filtered, or processed data. This sequential workflow may include: first, identifying time series vectors of observations that have highly correlated seasonality patterns but not necessarily the same magnitudes; second, identifying one vector (referred to herein as the principal vector) that will be used to isolate the seasonality pattern(s), and all other time series vectors will be referred to as the minor vector(s); third, identify the seasonality in the principal vector; fourth, scale the seasonality identified in the principal vector to the magnitude(s) of the minor vector(s) and subtract, with the result being called the remainder(s); and five, use of one or more methods (e.g., statistical methods) to detect outliers in the remainder(s). Based on the detection of such anomalies, various responses, statuses, and computer operations may be performed.

The presently disclosed anomaly detection process may be applied for detecting anomalies within a number of operational features and aspects of a computing system. In particular, the anomaly detection may apply into any software system or subsystem for which there is a primary event (e.g., execute, launch, open, download, and the like) that is accompanied by secondary events and activities (e.g., activities performed and data produced as a result of primary event). The following provides examples of such operational use cases, with the primary event tied to a "principal vector" and the secondary events tied to a "minor" or "secondary vector".

Computing System Platform. As an example, the anomaly detection process is usable to evaluate operation of a computing system platform, which executes a number of software processes, applications, and services. Platform usage represents the principal vector, and launches of (or events from) the applications or services on the platform represent the minor vector(s). Anomalies can be identified on the platform applications and the root cause application or event within an application may be identified as output of the process.

Software Application Operations. As an example, the anomaly detection process is usable to evaluate operation of events in a software application. In a software application setting, the launch of the application represents the principal vector, whereas events within the application represent the minor vector(s). Anomalies may be identified within the software application, and the root cause event/action within the application may be identified as output of the process.

Cloud Services. As an example, the anomaly detection process is usable to evaluate operation of a cloud service. In a cloud service scenario, access to the cloud action represents the principal vector. Events within the cloud represent the minor vector(s). Anomalies are identified within the cloud, and the root cause action/file access within the application may be identified as output of the process.

Cloud Applications. As an example, the anomaly detection process is usable to evaluate operation of cloud applications. Cloud applications such as office productivity applications (e.g., word processors, spreadsheets, presentation, note taking applications), enterprise software applications, and the like often create a large amount of seasonal data, depending on the time of day, day of the week, pre-scheduled events and holidays, and the like. Due to the large volume of data from use of such software applications, a variety of primary vectors (e.g., application access or execution) and minor vectors (e.g., application events) may be generated from ongoing processes of cloud applications.

Application Programming Interface Scenarios. As an example, the anomaly detection process is usable to analyze data produced from API Usage. In an API usage scenario, all API calls to the workload represents the principal vector. Calls to specific API workloads represent the minor vector(s). The anomaly analysis process may allow anomalies to be detected within the usage of the API's, with the problematic API identified.

Network Outage Scenarios. In an example, the anomaly detection process is usable to perform Network Outage analysis for a data communications network. In a network analysis scenario, all access events to the network represent the principal vector. Individual access or access locations represents the minor vector(s). Anomalies may be identified within the individual access points and the faulty access locations are identified as output.

Figure 2:
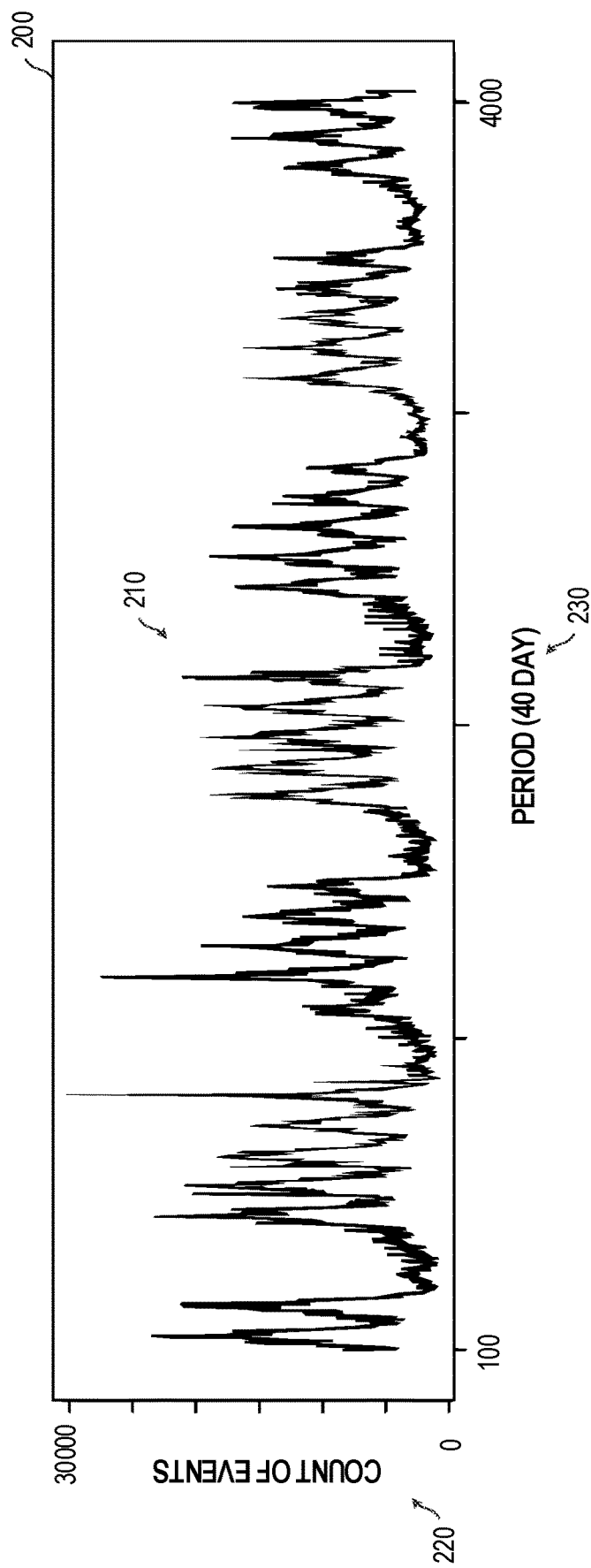
FIG. 2 illustrates a chart representation of an event stream occurring within a period of time, according to an example.

FIG. 2 illustrates a chart representation 200 of an event stream occurring within a period of time, according to an example. The chart representation 200 specifically represents measurements 210 on a count of events axis 220 (vertical axis) mapped along a forty-day time period axis 230 (horizontal axis). For instance, the measurements 210 may identify a raw event stream that bucket event counts per 10-15 minute period, as measured across the forty day period. In this example, given the weekly cycle that happens (e.g., as a result of Monday-Friday and Saturday, Sunday patterns) a 7-day period is needed to capture the pattern of seasonality. Other time periods and ranges may be applicable with the present techniques.

The activity vector f(x) of the measurements 210 represent four components: Trend (t); Anomalies (a); Seasonality (s); and Noise (n); such that the Activity vector=f(x)=t+s+a+n. Thus, an initial step of the anomaly detection process is to isolate and segment data into sets of measurements that can be analyzed to indicate activity trends. Although the measurements 210 include a wide variety of variation, the measurements 210 do include a large element of seasonality that may not be immediately observable. With the present techniques, seasonality may be considered in a process to determine whether some data value is anomalous.

Conventional anomaly detection approaches such as the Data Quality Platform (DQP) and similar methods only compare the current time period to previous time periods with similar seasonality patterns. For example, Mondays can only be compared to previous Mondays. As a result, such techniques do not explicitly account for seasonality. In addition to the bias that may be encountered by seasonality, there are several disadvantages to conventional approaches:

First, conventional approaches require multiple observations of previous periods (in the example of FIG. 2, the use of several Mondays to compare to, to determine the value for a particular Monday). This increases the time needed to collect observations before any analysis can be deployed. In addition, if there is an anomaly in the previous training period, such anomaly must be thrown out and the history considered to train the model.

Second, the models applied in conventional approaches are highly reliant on tuning parameters that attempt to balance out seasonality and noise to identify anomalies. These tuning parameters can be time intensive to train, so it is not feasible to deploy over a large number of different events.

Third, the models applied in conventional approaches do not consider the relationship between principal and minor events. As an example, a DQP system may be deployed for a specific event but does not use this information to evaluate anomalies in related events. Further, even if a DQP model is specifically designed to analyze anomalies in application launches or specific events in an application, there is no consideration for the relationship between application launches and activity levels for events within that application.

As will be apparent from the following paragraphs, the consideration of seasonality with the presently disclosed anomaly detection process may provide both processing and accuracy improvements over DQP and many other types of conventional anomaly modeling and analysis.

Figure 3:
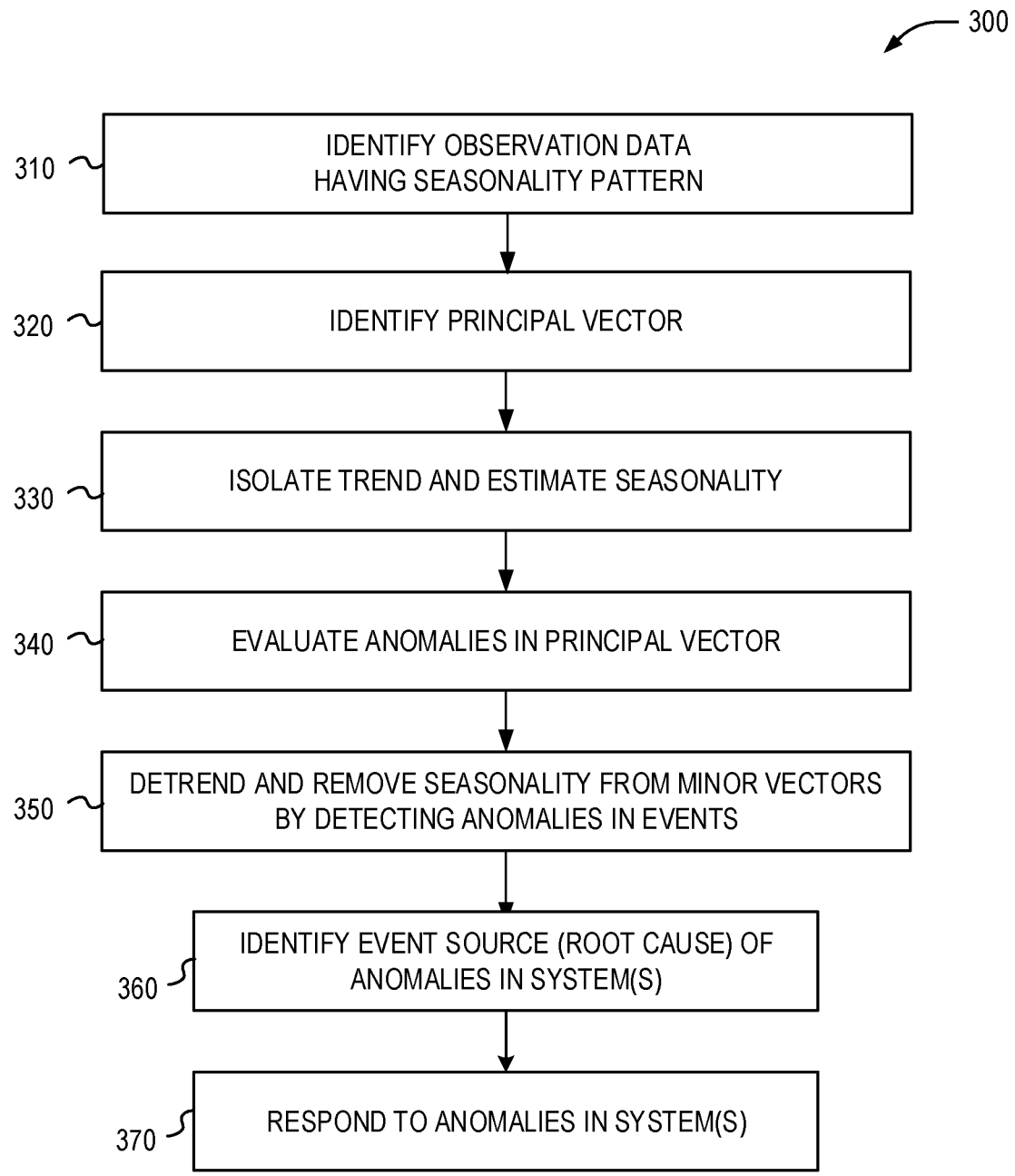
FIG. 3 illustrates a flowchart of operations for performing anomaly detection for an event stream, according to an example.

FIG. 3 illustrates a flowchart 300 of operations for performing anomaly detection for a data stream, according to an example. These operations are illustrated in part by the accompanying data depictions of FIGS. 4 to 10. As used in the examples herein, warm path generally refers to data with 5 to 15 minute latency to anomaly detection, whereas hot path generally refers to data with a maximum of 60 seconds latency to anomaly detection. However, the applicability of the present anomaly detection techniques may occur equally with other variations of warm or hot path data, or upon the use of historical data (which may be considered cold data).

In operation 310, initial operations are performed to identify data observations that have seasonality patterns. Conventionally, such vectors would be observed in time series data where the periodicity of seasonality is similar among all events or vectors even if the magnitude(s) is (or are) much different. In such settings, a nontrivial amount of domain knowledge would be necessary to ascertain not only that seasonality exists but that the same seasonality can be expected throughout the dataset. That is, the seasonality observed in the principal vector will be roughly equivalent to the seasonality in the minor vector(s). However, with the approach of flowchart 300, the identification and evaluation of the seasonality occurs in a seamless fashion.

In operation 320, operations are performed to identify the principal vector. The principal vector may be considered as the primary (or major) vector of observations from which the seasonality will be derived. As a result, the vector should reflect seasonality that is common throughout the dataset. While the overall magnitude of seasonality within the principal vector is not important, the relative magnitudes for each component of seasonality should be equivalent between the principal and minor vectors.

In operation 330, further operations are performed to isolate trend and estimate seasonality within the principal vector. This can be done by transforming the data into the frequency spectrum then applying a high pass filter based on magnitude. Rebuilding this signal after the threshold is applied will isolate the seasonality.

In operation 340, further operations are performed to evaluate anomalies in the principal vector, and in operation 350, further operations are performed to scale the seasonality to the magnitude(s) of the minor vector(s), and detect anomalies in specific events or origins.

In an example, the input is a vector of counts for events over discrete time intervals comprised of trend (t), seasonality (s), anomalies (a), and noise (n), represented by the function: $f(x)=t+s+a+n$, and the expected seasonality can be derived by applying a threshold to the transformed de-trended data based on frequency magnitudes. The value of the threshold that should be used is determined via train and test procedures. In this way, the threshold may be equivalent to a tuning parameter of another algorithm and given by $\lambda$. Also in an example, a fast Fourier transform ("FFT", embodied by a "fft" function) may sample a set of input data in connection with estimating a seasonality.

In the following equation $fft(s+a+n)$ [$\lambda$] is the vector of frequencies of the original, detrended data greater than the threshold parameter and $fft^{-1}$ is the inverse transformation of the thresholded frequencies:

$$E(s)=fft^{-1}(fft(s+a+n)[\lambda])$$

The result of this methodology is an estimate of the seasonal trend for the time period. The difference between the estimated seasonality and the de-trended data is equal to the residuals (r) which are evaluated using traditional statistical methods for detecting outliers:

$$r=s+a+n-E(s)=a+n+\varepsilon$$

The effectiveness of the thresholded FFT model may be considered in determining the theoretical 'true' seasonality. This difference is represented by ($\varepsilon$) in the equations above. The magnitude of these residuals compared to the magnitude of the anomaly plus noise determine the effectiveness of the model in detecting anomalies. Thus, if the error plus the noise is larger than the anomaly itself, the model will fail to detect.

Subsequent periods to the training period from which the FFT was derived should be used to evaluate the effectiveness of the model. Specifically, the magnitude of the error in the estimation of seasonality, magnitude of anomalies, and noise may be compared as follows:

$$\varepsilon=s-E(s)$$

Once the seasonality has been properly identified and evaluated, the seasonality can be scaled to the magnitude of related activity vectors (referred to as the minor vectors). Continuing with the previous examples, if the principal vector captures total launches of an application over uniform, discrete time intervals, the minor vector captures related activities over the same time intervals (e.g., actions within the application itself). In this way, the principal vector and minor vectors are closely related but on a different scale. A scaled expected or estimated seasonality index may be calculated as:

$$E_i(s) = \frac{E_p(s) - \min(E_p(s))}{\max(E_p(s)) - \min(E_p(s))}$$

The expected or estimated seasonality index is then multiplied by the minor vector to scale the seasonality appropriately:

$$E_m(s)=E_i(s)*\max(f_m(x))$$

Noise is accounted for by taking the standard deviation of the minor vector over the given time period plus or minus a multiplier that is taken as an additional input parameter. Observations in the minor vector that lay outside this interval are then determined to be anomalous.

In operation 360, an event source or root cause of one or more anomalies can be identified by evaluating residuals in the minor vector(s). As suggested above, this may be performed by isolating the residuals in each of the minor vector(s) as calculated by subtracting the scaled seasonality identified in the principal vector from the minor vector(s) (produced from operation 350). These residuals can then be evaluated to identify anomalies using statistical techniques. Finally, in operation 370, with the identification of the particular anomalies and the event source, the computing system may cause various responses (operations, actions, etc.) to respond to the anomalies. Accordingly, the anomaly detection process can be deployed to entire system of minor vectors, with the output being the identification of the source or root cause of an anomaly.

Figure 4:
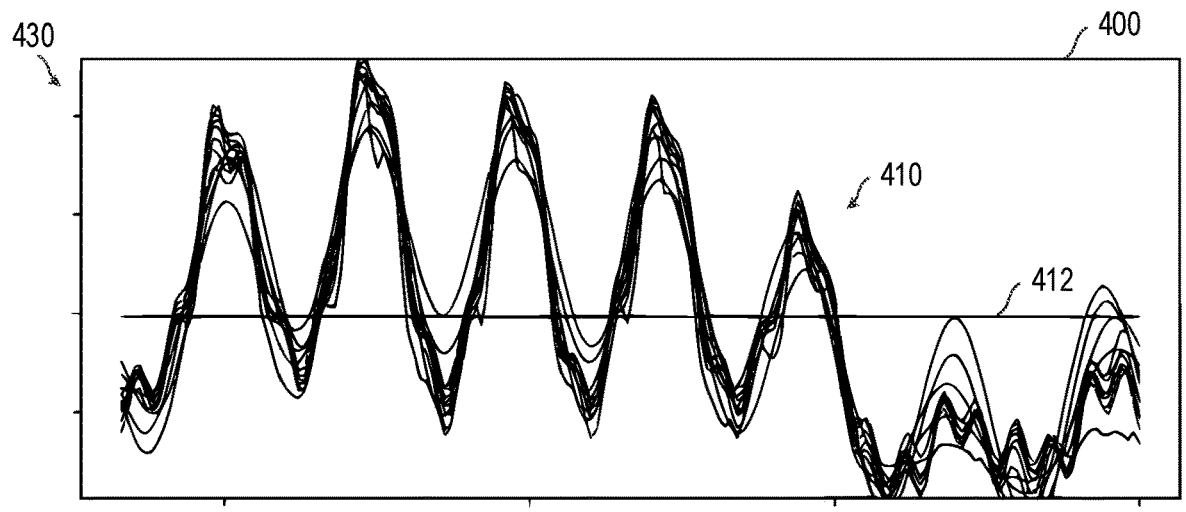
FIG. 4 illustrates a chart representation of component frequencies of the event stream represented in FIG. 2, according to an example.
Figure 5:
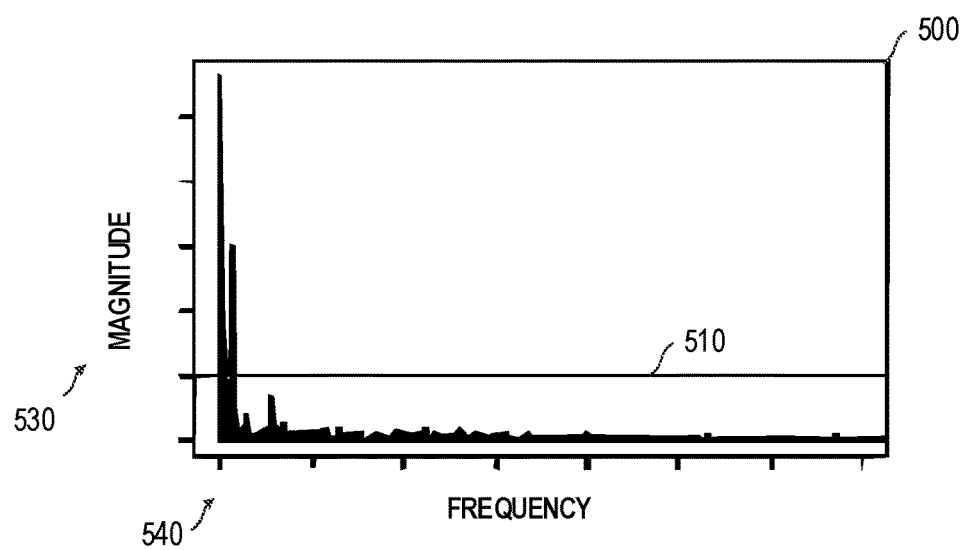
FIG. 5 illustrates a chart representation of a frequency spectrum plot, for the component frequencies of the event stream represented in FIG. 2, according to an example.

In the following paragraphs, FIGS. 4 to 11 provide further graphical illustrations of the anomaly detection process, as applied to the measurements 210 in the event data set represented in FIG. 2. As a first example, FIGS. 4 and 5 illustrate an example evaluation of seasonality, with FIG. 4 illustrating a chart representation 400 of component frequencies of the event stream of FIG. 2, and FIG. 5 illustrating a chart representation 500 of a frequency spectrum plot, for the component frequencies of the event stream represented in FIG. 2.

In the chart representation 400, charted data values 410 are identified relative to an event count axis 430 across a time period axis 440. The charted data values 410 are produced from a previous time period of equivalent duration which represents the training period. This training period can be a fixed interval behind the period under analysis as new data streams into the time series. This has the effect of mitigating the impact of trend changes over time. The amount of seasonality identified in the time series is controlled by the hyperparameter ($\lambda$). In the chart representation 500, data values are identified relative to a magnitude value axis 530 and a frequency value axis 540. Seasonality can be estimated by transforming the data into component frequencies, then applying a low-pass filter equal to $\lambda$510. Values above the frequency cutoff value ($\lambda$) are isolated and disregarded as noise.

Figure 6:
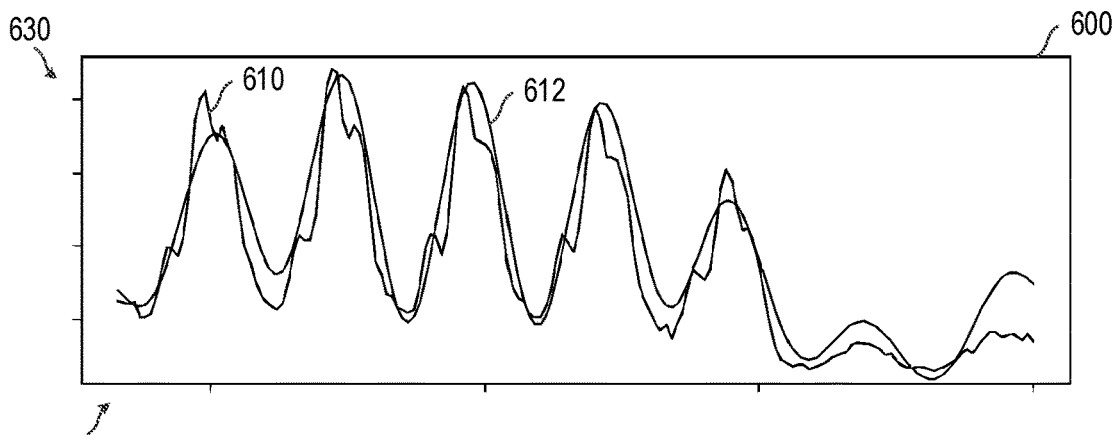
FIG. 6 illustrates a chart representation of estimated seasonality values, derived from the event stream represented in FIG. 2, according to an example.

FIG. 6 illustrates a chart representation 600 to identify estimated seasonality values, derived from the event stream represented in FIG. 2, using the processed data values obtained from FIGS. 4 and 5. In this example, an average data value 610 (e.g., corresponding to the average of the data values 410) is charted on the event count axis 630 across the time period axis 640. This is used to generate a model of an estimated seasonality value 612. Specifically, the generation of an estimated seasonality value 612 may be performed based on rebuilding the signal based on the output of the low-pass filter. As discussed above, this may be performed with the application of:

$$E(s)=fft^{-1}(fft(s+a+n)[\lambda])$$

Figure 7:
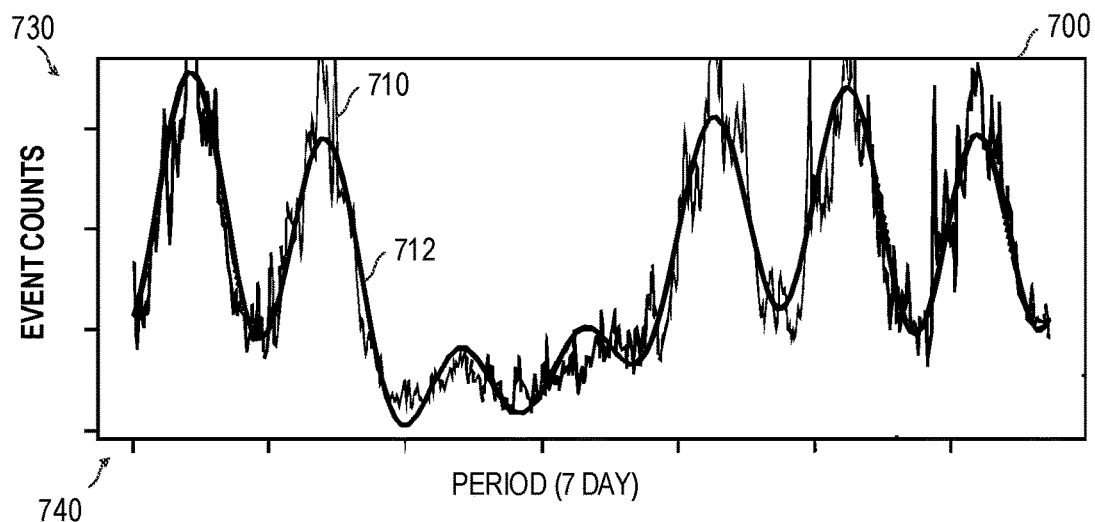
FIG. 7 illustrates a chart representation of event counts and estimated seasonality relative to event counts, derived from the event stream represented in FIG. 2, according to an example.
Figure 8:
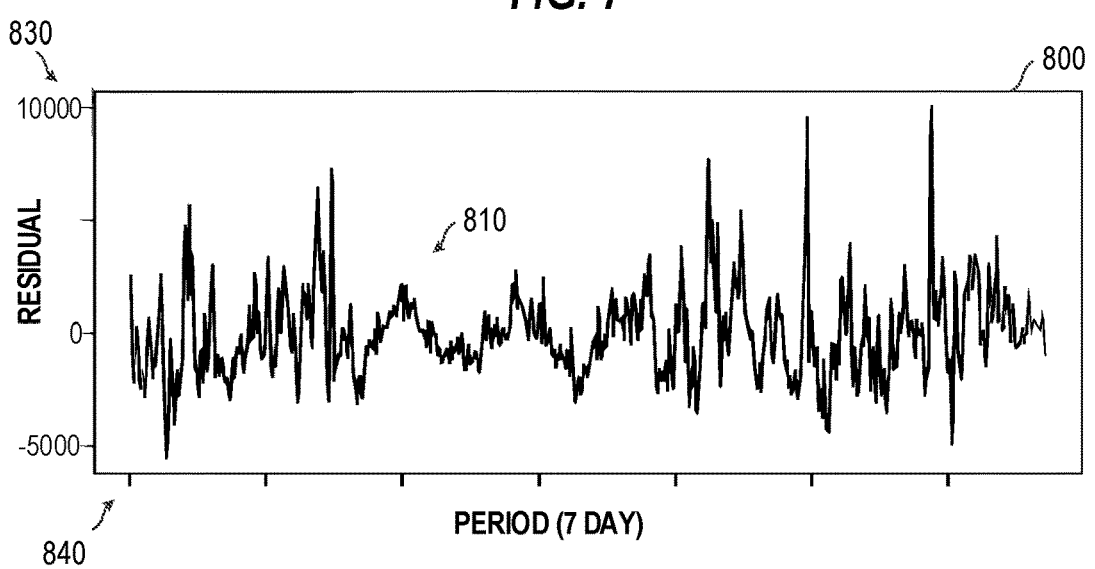
FIG. 8 illustrates a chart representation of event counts and seasonality relative to residual events, derived from the event stream represented in FIG. 2, according to an example.

FIG. 7 illustrates an example chart representation 700 of event counts and estimated seasonality relative to event counts, and FIG. 8 illustrates an example chart representation 800 of event counts and seasonality relative to residual events. The chart representation 700 specifically illustrates an event counts axis 730 mapped across a time period axis 740, to illustrate estimated seasonality values 712 relative to comparison to data values 710 in a training period (as shown, a 7 day training period).

The chart representation 800 specifically illustrates a residual event data count, charted in a residual event count axis 830 mapped across a time period axis 840, to reflect the removal of estimated seasonality data in the training period. As discussed above, the residuals can be calculated by:

$$r = s + a + n - E(s) = a + n + \varepsilon$$

Figure 9:
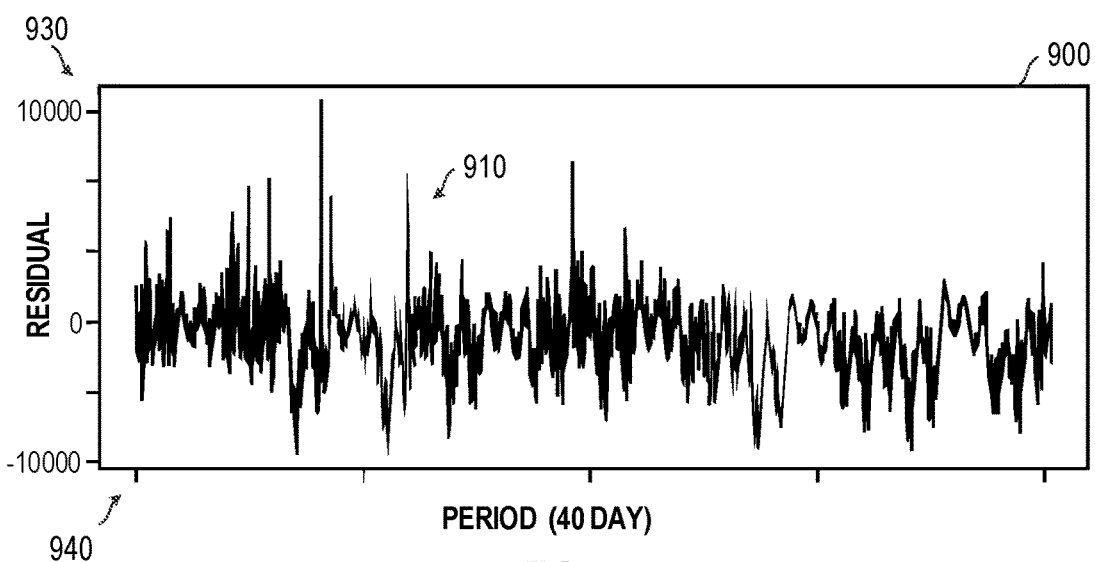
FIG. 9 illustrates a chart representation of seasonality-removed residuals in an entire activity stream, derived from the event stream represented in FIG. 2, according to an example.

FIG. 9 illustrates a chart representation 900 of seasonality-removed residuals as applied to an entire activity stream, derived from the event stream represented in FIG. 2 and in a similar fashion as depicted in chart representation 800. The chart representation 900 indicates residual values 910, mapped along a residual axis 930 across a time period axis 940, which has been expanded to a larger time period (the entire time period of the activity stream, 40 days). The entire activity stream, depicted in the chart representation 900, is represented by $a+n+\varepsilon$ in the equation above. In this manner, residuals from an entire event stream, or a small event stream (e.g., involving hot or warm path data), may be determined by subtracting the estimated seasonality from the original signal, and applying statistical analysis on the residuals to identify anomalies.

Figure 10:
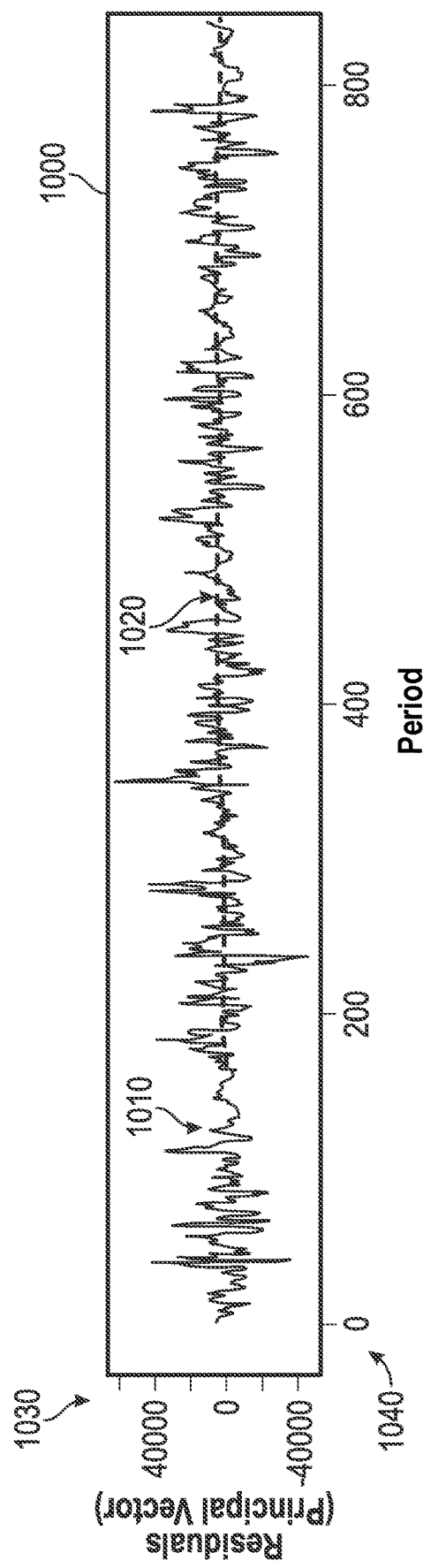
FIGS. 10 and 11 illustrate chart representations of estimating seasonality and identifying anomalies from a related activity steam, based on the analysis performed with the event stream represented in FIGS. 2 to 9, according to an example.
Figure 11:
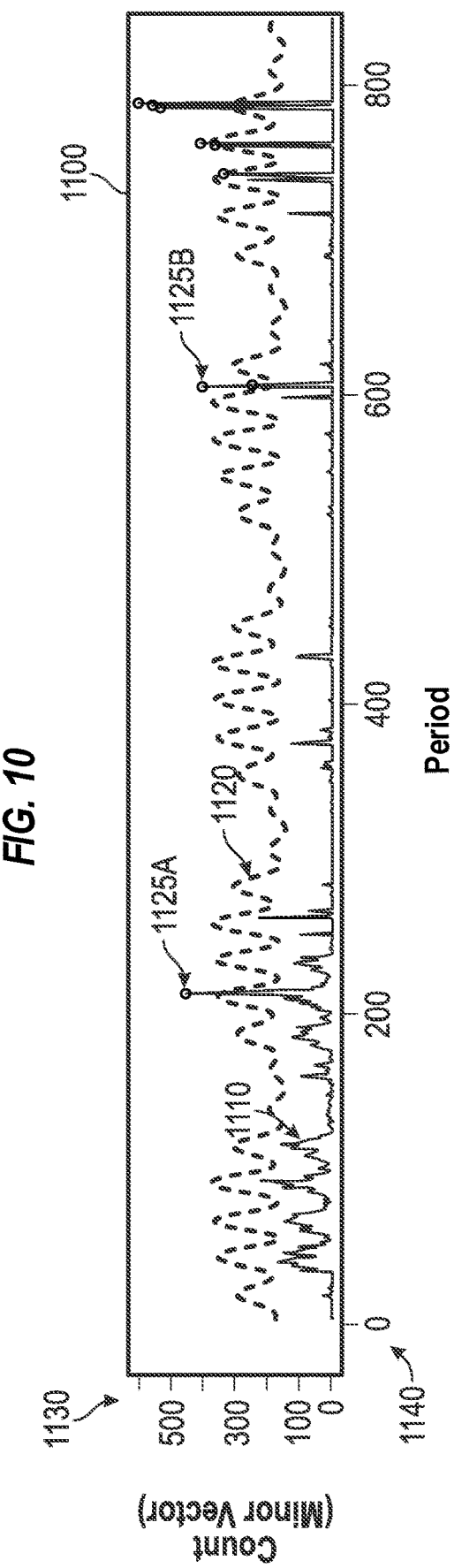

FIGS. 10 and 11 illustrate chart representations 1000, 1100 of estimating seasonality and identifying anomalies from a primary (a superset) and a related (subset) activity streams, based on the analysis performed on the event stream discussed above for FIGS. 2 to 9, according to an example. As shown in FIG. 10, the chart representation 1000 illustrates a mapping of residual data values 1010 (data values with estimated seasonality removed) for a principal vector axis 1030 relative to a time period axis 1040. The line 1020 is a conventional statistical calculation (e.g., a rolling mean or another type of moving average) applied to the residuals for the identification of anomalies within the principal vector and if there is a trend change within the period.

Also, as shown in FIG. 11, the chart representation 1100 illustrates a count of data events for a minor vector, such as determined from a subset of the data events (e.g., events of a specific type or characteristic) tracked by the principal vector. As shown, an estimate of a seasonality-adjusted maximum 1120, relative to a set of residual data values 1110, is mapped in a minor vector count axis 1130 relative to a time period axis 1140. Notably, values that exceed the seasonality-adjusted maximum 1120 may be easily identified, such as shown with data value 1125A and data value 1125B (and additional data values without reference numerals that exceed the maximum 1120). These data values 1125 may be identified as anomalous, even as many other sharp spikes in the residual data values 1110 are not identified as anomalous.

Figure 12:
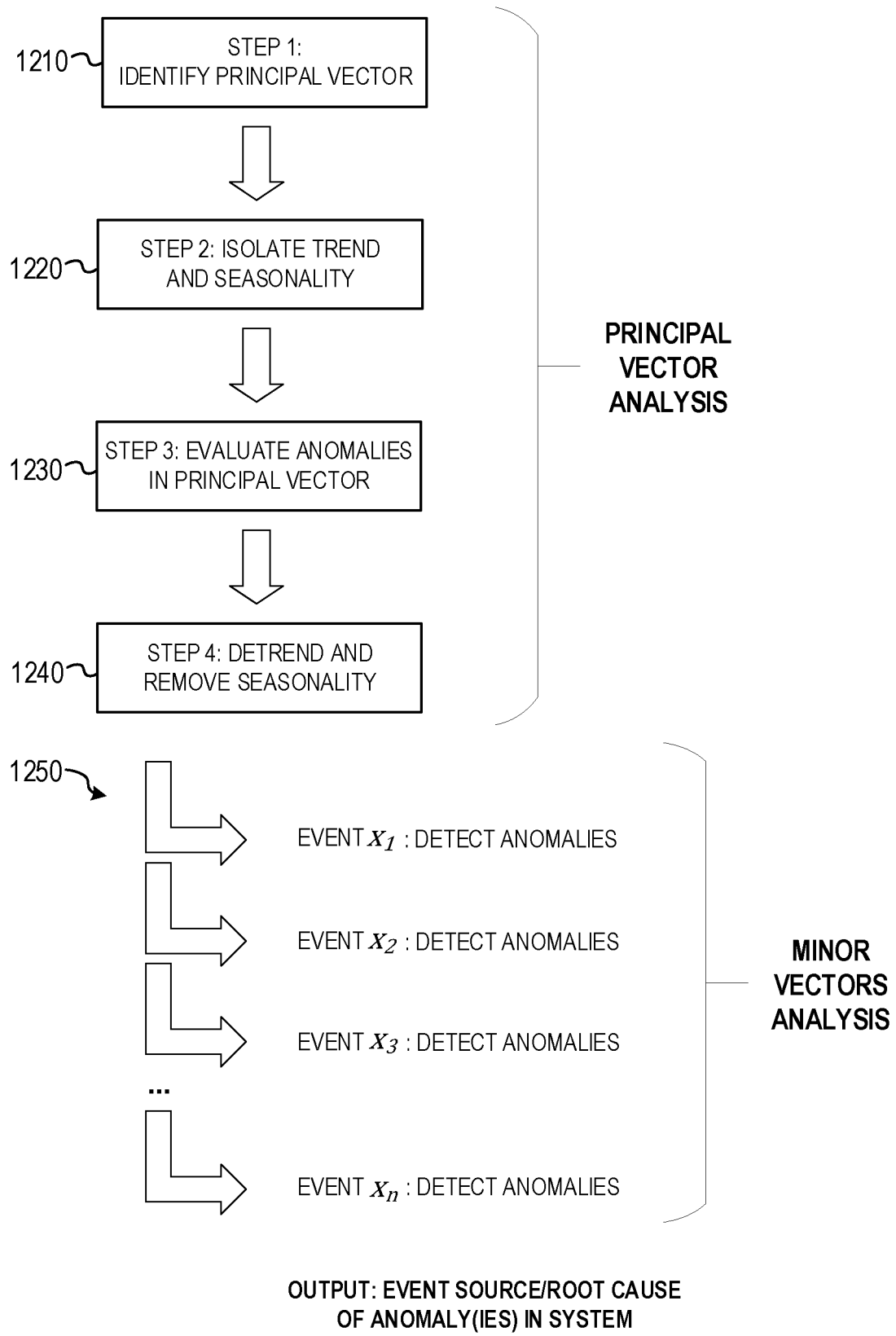
FIG. 12 illustrates an operational flow of performing analysis of a principal vector and multiple minor vectors, according to an example.

FIG. 12 illustrates an operational flow of performing analysis of a principal vector and multiple minor vectors, according to an example. As shown, the respective steps of identifying a principal vector from a data set (operation 1210), isolating trend and seasonality from the data set (operation 1220), evaluating anomalies in the principal vector (operation 1230), and detrending and removing seasonality (operation 1240) may be performed as part of a principal vector analysis. The results of the principal vector analysis corresponds to the data visualization shown in FIG. 10. The operational flow, however, expands to the analysis of multiple minor vectors, to detect anomalies based on respective events $X_1$ to $X_n$ (operation 1250) as the principal vector is deconstructed into multiple minor vectors. Thus, the results of a respective minor vector analysis may correspond to the data visualization shown in FIG. 11 (repeated for each applicable subset event stream 1 to n).

Figure 13:
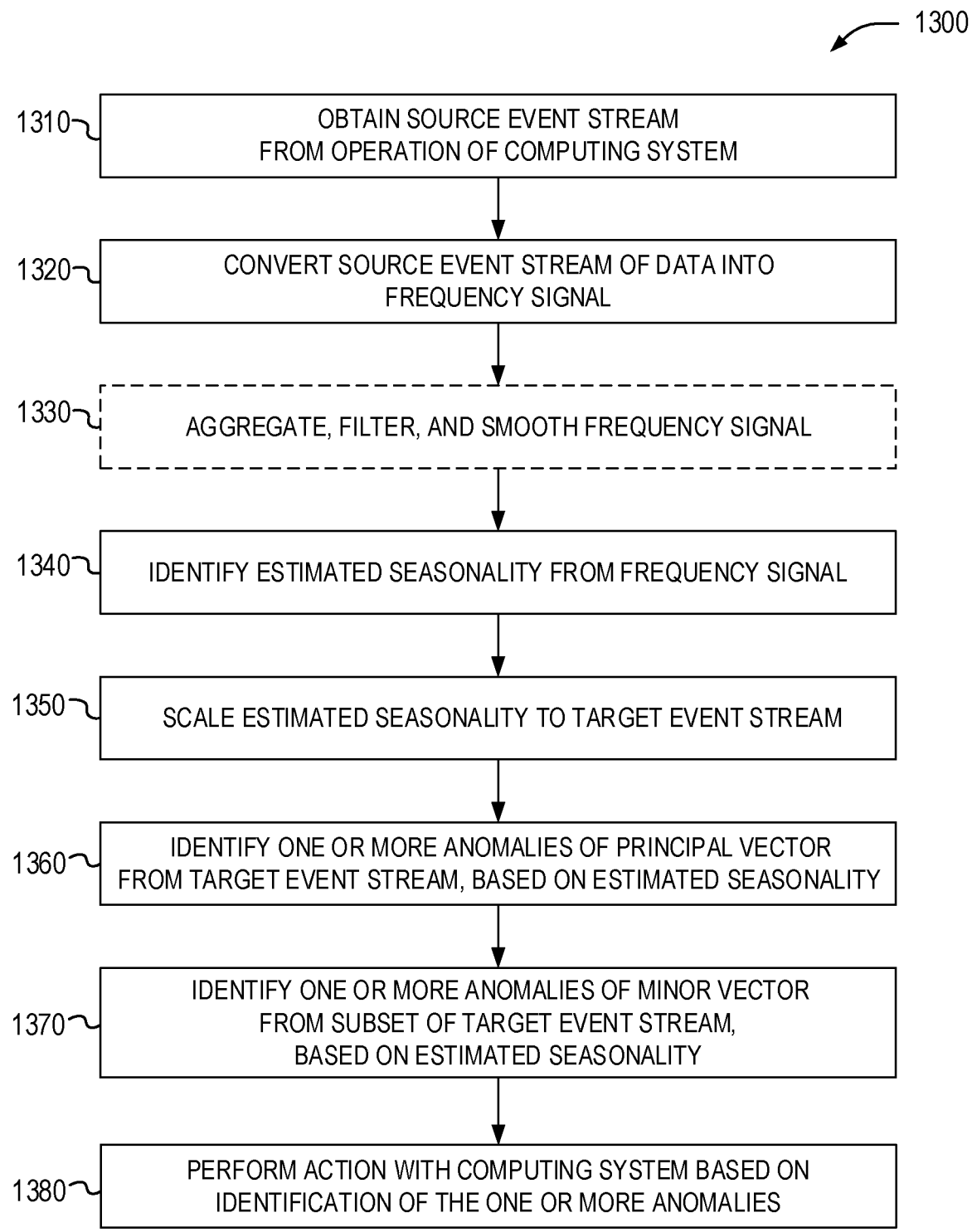
FIG. 13 illustrates a flowchart of a method for detecting and responding to anomalies from computing system events, according to an example.

FIG. 13 is a flowchart 1300 of an example method for detecting and responding to anomalies from computing system events, according to an example. It will be understood that the operations of the flowchart 1300 may be implemented in connection with a computer-implemented method, instructions on a computer program product, or on a configuration of a computing device (or among multiple of such methods, products, or computing devices). In an example, the electronic operations are performed by a computing device that includes a processor to perform electronic operations to implement the method. However, other variation in software and hardware implementations may also accomplish the method.

As shown, the operations of the flowchart 1300 commence at operation 1310 to obtain, receive, or process data from a source event stream, produced from operation of a computing system (e.g., the same computing system, a monitored computing system, etc.). The operations of the flowchart continue to convert the source event stream of data into a frequency signal at operation 1320. In a further example, the source event stream is converted to indicate a count of events obtained from the operation of the system per time interval, such that the event stream of data is converted to represent the count of events into the frequency signal. In further examples, the frequency signal may be aggregated, filtered, and smoothed, at operation 1330. For example, the event stream of data may be converted into the signal further by applying a fast Fourier transform to the signal, and applying the low pass filter to exclude data values exceeding a defined value.

The operations of the flowchart 1300 continue to identify an estimated seasonality from the frequency signal at operation 1340, and to scale the estimated seasonality to a target event stream at operation 1350. In an example, the target event stream of data is also produced from operation of the computing system, such as from warm or hot path data. In an example, scaling the estimated seasonality to the target event stream of data includes subtracting the estimated seasonality from the signal to identify a set of residuals.

The operations of the flowchart 1300 continue to identify one or more anomalies of a principal vector from the target event stream, based on deviation of the target event stream of data from the estimated seasonality, at operation 1360. In an example, identifying the anomaly includes applying a statistical analysis on the set of residuals.

The operations of the flowchart 1300 also continue to identify one or more anomalies of at least one minor vector, based on deviation of a subset of a target event stream of data from the estimated seasonality, at operation 1370. For example, the at least one minor vector may be determined by scaling the estimated seasonality to the subset of the target event stream of data, where the subset of the target event stream of data indicates at least one minor vector. In a further example, the principal vector is based on usage of the computing system, and the one or more minor vectors are respectively based on usage of one or more software applications represented in the usage of the computing system. Also in a further example, residual data used to determine the anomalies is generated by removing data values exceeding the estimated seasonality from the subset of the target event stream of data, and applying a statistical method to the residual data to identify the one or more anomalies of the at least one minor vector from the residual data.

The operations of the flowchart 1300 conclude to cause the computing system to perform an action from, or with, the computing system. These actions may be based on the one or more identified anomalies determined from the target event stream of data, or from the one or more identified anomalies of the at least one minor vector, at operation 1380. Any number of actions with the same or different computing systems may be performed, according to the examples discussed herein. For instance, various types of remedial, corrective, alerting, or modification actions may be triggered or controlled in an API, cloud service, software application, computing platform, according to the scenarios and use cases discussed herein.

Figure 14:
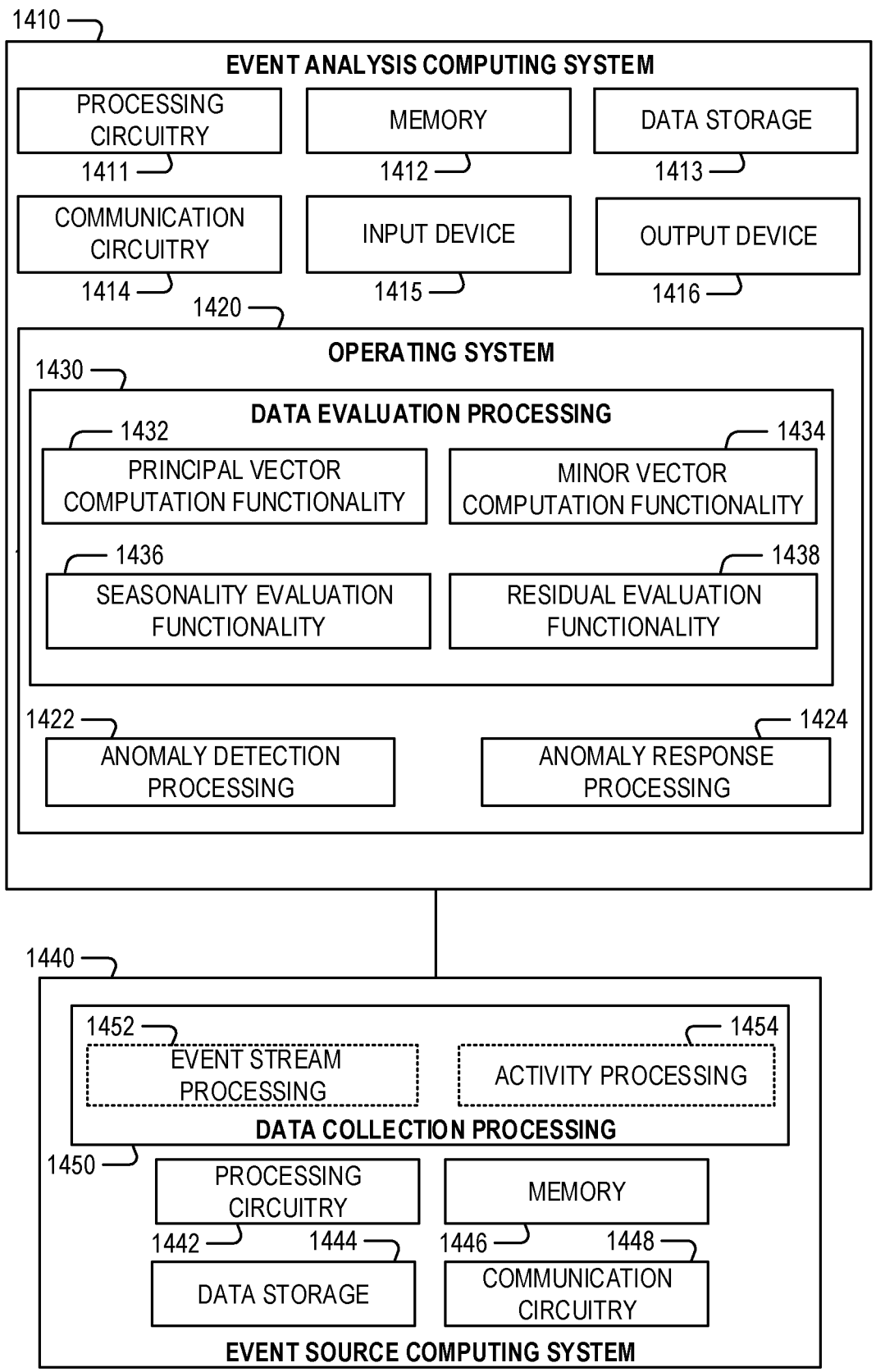
FIG. 14 illustrates a block diagram of hardware and functional components of a computing system to implement operations that detect and respond to anomalies from computing system events, according to an example.

FIG. 14 illustrates a block diagram 1400 of hardware and functional components of an event analysis computing system 1410 and an event source computing system 1440 to implement an anomaly detection for data streams, such as are accomplished with the examples described above. It will be understood, that although certain hardware and functional components are depicted in FIG. 14 and in other drawings as separate systems or components, the features of the components may be integrated into a single system or service (e.g., in a single computing system including data collection and analysis features). Further, although only one (client) event analysis computing system and one (server) event source computing system is configured, it will be understood that the features of these systems may be distributed among one or multiple computing systems, including in cloud-based processing settings.

As shown, the event analysis computing system 1410 includes processing circuitry 1411 (e.g., a CPU) and a memory 1412 (e.g., volatile or non-volatile memory) used to perform electronic operations (e.g., via instructions) to process data to detect, identify, and respond to anomalies (e.g., to implement the techniques depicted in FIGS. 1-13); data storage 1413 to store commands, instructions, and other data for operation and use of the anomaly detection, identification, and response operations; communication circuitry 1414 to communicate with an external network or devices via wired or wireless networking components for the anomaly detection, identification, and response operations; an input device 1415 (e.g., an alphanumeric, point-based, tactile, audio input device) to receive input from a human user; and an output device 1416 (e.g., visual, acoustic, haptic output device) to provide output to the human user.

In an example, the event analysis computing system 1410 is adapted to perform anomaly processing from an event stream, within an operating system platform 1420 (e.g., implemented by circuitry or software instructions), such as through anomaly detection processing or functionality 1422 used to detect conditions for one or more anomalies in operations of a target data stream (or a target computing system producing the data stream), anomaly response processing 1424 used to cause an effect or operation as a result of identifying the one or more anomalies; and data evaluation processing 1430 used specifically implement a process for analyzing anomaly values from a data stream. Although FIG. 14 depicts the execution of the components 1430, 1422, 1424 within an operating system 1420 within the same computing system 1410, it will be understood that these components may be executed on other computing systems, including multiple computing systems as orchestrated in a server-based (e.g., cloud) deployment.

In an example, the event analysis computing system 1410 is adapted to implement the data evaluation processing 1430, through respective features including: principal vector computation functionality 1432 (e.g., circuitry or software instructions) used to analyze a principal vector in a data stream; minor vector computation functionality 1434 (e.g., circuitry or software instructions) used to analyze a minor vector in the data stream; seasonality evaluation functionality 1436 (e.g., circuitry or software instructions) used to estimate a seasonality component of the data stream; and residual evaluation functionality 1438 (e.g., circuitry or software instructions) used to consider (and remove or reduce) the seasonality component of the data stream, to assist in anomaly processing.

As shown, the event source computing system 1440 includes processing circuitry 1443 (e.g., a CPU) and a memory 1445 (e.g., volatile or non-volatile memory) used to perform electronic operations (e.g., via instructions) for generating, collecting, and providing data for an event stream related to computing system operations (e.g., to provide data for the event stream analysis discussed above with reference to FIGS. 1-13). The event source computing system 1440 further includes data storage 1444 to store commands, instructions, and other data for the described event data collection and data analysis operations; and communication circuitry 1446 to communicate with an external network or devices via wired or wireless networking components for the event data collection and data analysis operations. In an example, the server computing system 1440 is adapted to coordinate the collection of data through respective features including: event stream processing 1452 (e.g., circuitry or software instructions) used to monitor and record data values in a time period from a monitored computing system or software feature; and activity processing 1454 (e.g., circuitry or software instructions) used to monitor individual activities occurring in the monitored computing system or software feature. Other variations to the roles and operations performed by the event source computing system 1440 and the event analysis computing system 1410 may also implement the anomaly detection techniques discussed herein.

As referenced above, the embodiments of the presently described electronic operations may be provided in machine or device (e.g., apparatus), method (e.g., process), or computer- or machine-readable medium (e.g., article of manufacture or apparatus) forms. For example, embodiments may be implemented as instructions stored on a machine-readable storage medium, which may be read and executed by a processor to perform the operations described herein. A machine-readable medium may include any non-transitory mechanism for storing information in a form readable by a machine (e.g., a computer). A machine-readable medium may include a single medium or multiple media (e.g., a centralized or distributed database, and/or associated caches and servers) that store the one or more instructions.

A machine-readable medium may include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. A machine-readable medium shall be understood to include, but not be limited to, solid-state memories, optical and magnetic media, and other forms of storage devices. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and optical disks. The instructions may further be transmitted or received over a communications network using a transmission medium (e.g., via a network interface device utilizing any one of a number of transfer protocols).

Although the present examples refer to various forms of cloud services and infrastructure service networks, it will be understood that may respective services, systems, and devices may be communicatively coupled via various types of communication networks. Examples of communication networks include a local area network (LAN), a wide area network (WAN), the Internet, mobile telephone networks, plain old telephone (POTS) networks, and wireless data networks (e.g., Wi-Fi, 2G/3G, 4G LTE/LTE-A, 5G, or other personal area, local area, or wide area networks).

Embodiments used to facilitate and perform the electronic operations described herein may be implemented in one or a combination of hardware, firmware, and software. The functional units or capabilities described in this specification may have been referred to or labeled as components, processing functions, or modules, in order to more particularly emphasize their implementation independence. Such components may be embodied by any number of software or hardware forms. For example, a component or module may be implemented as a hardware circuit comprising custom circuitry or off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. The executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as the command and control service) may take place on a different processing system (e.g., in a computer in a cloud-hosted data center), than that in which the code is deployed (e.g., in a test computing environment). Similarly, operational data may be included within respective components or modules, and may be embodied in any suitable form and organized within any suitable type of data structure. The operational data may be collected as a single data set, or may be distributed over different locations including over different storage devices.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing device, comprising:
    a processor; and
    a memory device including instructions embodied thereon, wherein the instructions, which when executed by the processor, cause the processor to perform operations to detect anomalies from computing system events, the operations comprising:
        obtaining a source event stream of data, the source event stream of data produced from operation of a computing system;
        converting the source event stream of data into a frequency signal;
        identifying an estimated seasonality from the frequency signal;
        identifying a principal vector of a target event stream of data correlated to the estimated seasonality, the target event stream of data produced from further operation of the computing system;
        scaling the estimated seasonality to a subset of the target event stream of data, the subset of the target event stream of data indicating one or more minor vectors;
        identifying the one or more minor vectors from the subset of the target event stream of data;
        identifying a seasonality of the principal vector;
        scaling the seasonality of the principal vector to a magnitude of the one or more minor vectors;
        identifying one or more anomalies of the one or more minor vectors based on deviation of the one or more minor vectors from the scaled seasonality of the principal vector;
        identifying one or more anomalies of the one or more minor vectors based on deviation of the subset of the target event stream of data from the estimated seasonality; and
        causing the computing system to perform an action based on the one or more identified anomalies, the principal vector and the one or more minor vectors occurring from a combination of Application Programming Interface (API) calls to a workload source used by the computing system that is represented by the principal vector and respective API calls to the workload source that are represented by the one or more minor vectors.

2. The computing device of claim 1, the operations further comprising:
    generating residual data by removing data values exceeding the estimated seasonality from the subset of the target event stream of data; and
    applying a statistical method to the residual data to identify the one or more anomalies of the one or more minor vectors from the residual data.

3. The computing device of claim 1, wherein the principal vector is based on usage of the computing system, and wherein the one or more minor vectors are respectively based on usage of one or more software applications represented in the usage of the computing system.

4. The computing device of claim 1, wherein the operations of scaling the estimated seasonality to the target event stream of data include subtracting the estimated seasonality from the frequency signal to identify a set of residuals, and wherein the operations of identifying the one or more anomalies include applying a statistical analysis on the set of residuals.

5. The computing device of claim 1, wherein the source event stream indicates a count of events obtained from a computing system per time interval, wherein the source event stream of data is converted to represent the count of events into the frequency signal.

6. The computing device of claim 1, wherein the frequency signal is representative of a combination of trend, seasonality, anomalies, and noise, and wherein the target event stream of data is selected based on identified vectors of observations that have similar seasonality patterns.

7. The computing device of claim 1, wherein the operations of converting the source event stream of data into the frequency signal include transforming the source event stream of data into component frequencies, and applying a low pass filter.

8. The computing device of claim 7, wherein the operations of converting the source event stream of data into the frequency signal further include applying a fast Fourier transform to the frequency signal, and applying the low pass filter to exclude data values exceeding a defined value.

9. A non-transitory machine-readable storage medium, the machine-readable storage medium including instructions that, when executed by a processor and memory of a machine, causes the machine to perform operations comprising:
    parsing a source event stream of data, the source event stream of data produced from operation of a computing system;
    converting the source event stream of data into a frequency signal;
    identifying an estimated seasonality from the frequency signal;
    identifying a principal vector of a target event stream of data correlated to the estimated seasonality, the target event stream of data produced further from operation of the computing system;
    scaling the estimated seasonality to a subset of the target event stream of data, the subset of the target event stream of data indicating one or more minor vectors;
    identifying the one or more minor vectors from the subset of the target event stream of data;
    identifying a seasonality of the principal vector;
    scaling the seasonality of the principal vector to a magnitude of the one or more minor vectors;
    identifying one or more anomalies of the one or more minor vectors based on deviation of the one or more minor vectors from the scaled seasonality of the principal vector;
    identifying one or more anomalies of the one or more minor vectors, based on deviation of the subset of the target event stream of data from the estimated seasonality; and
    causing the computing system to perform an action based on the identified one or more anomalies, the principal vector and the one or more minor vectors occurring from a combination of Application Programming Interface (API) calls to a workload source used by the computing system that is represented by the principal vector and respective API calls to the workload source that are represented by the one or more minor vectors.

10. The machine-readable storage medium of claim 9, the operations further comprising:
    generating residual data by removing data values exceeding the estimated seasonality from the subset of the target event stream of data; and
    applying a statistical method to the residual data, to identify the one or more anomalies of the one or more minor vectors from the residual data;
    wherein the principal vector is based on usage of the computing system, and wherein the one or more minor vectors are respectively based on usage of one or more software applications represented in the usage of the computing system.

11. The machine-readable storage medium of claim 9, wherein the operations of scaling the estimated seasonality to the target event stream of data include subtracting the estimated seasonality from the frequency signal to identify a set of residuals, and wherein the operations of identifying the one or more anomalies include applying a statistical analysis on the set of residuals.

12. The machine-readable storage medium of claim 9, wherein the operations of converting the source event stream of data into the frequency signal include transforming the source event stream of data into component frequencies, applying a fast Fourier transform to the frequency signal, and applying a low pass filter to exclude data values exceeding a defined value.

13. A method, comprising a plurality of operations executed with a processor and memory of a computing device, the plurality of operations comprising:
    receiving a source event stream of data, the source event stream of data produced from operation of a computing system;
    converting the source event stream of data into a frequency signal;
    identifying an estimated seasonality from the frequency signal;
    identifying a principal vector of a target event stream of data correlated to the estimated seasonality, the target event stream of data produced from further operation of the computing system;
    scaling the estimated seasonality to a subset of the target event stream of data, the subset of the target event stream of data indicating one or more minor vectors;
    identifying the one or more minor vectors from the subset of the target event stream of data;
    identifying a seasonality of the principal vector;
    scaling the seasonality of the principal vector to a magnitude of the one or more minor vectors;
    identifying one or more anomalies of the one or more minor vectors based on deviation of the one or more minor vectors from the scaled seasonality of the principal vector;
    identifying one or more anomalies of the one or more minor vectors based on deviation of the subset of the target event stream of data from the estimated seasonality; and
    causing the computing system to perform an action based on the identified one or more anomalies, the principal vector and the one or more minor vectors occurring from a combination of Application Programming Interface (API) calls to a workload source used by the computing system that is represented by the principal vector, and respective API calls to the workload source that are represented by the one or more minor vectors.

14. The method of claim 13, the operations further comprising:
    generating residual data by removing data values exceeding the estimated seasonality from the subset of the target event stream of data; and applying a statistical method to the residual data, to identify the one or more anomalies of the one or more minor vectors from the residual data;

wherein the principal vector is based on usage of the computing system, and wherein the one or more minor vectors are respectively based on usage of one or more software applications represented in the usage of the computing system.

15. The method of claim 13, wherein the operations of scaling the estimated seasonality to the target event stream of data include subtracting the estimated seasonality from the frequency signal to identify a set of residuals, and wherein the operations of identifying the one or more anomalies include applying a statistical analysis on the set of residuals.

16. The method of claim 13, wherein the operations of converting the source event stream of data into the frequency signal include transforming the source event stream of data into component frequencies, applying a fast Fourier transform to the frequency signal, and applying a low pass filter to exclude data values exceeding a defined value.

\* \* \* \* \*